United States Patent Office 3,682,805
Patented Aug. 8, 1972

3,682,805
PROCESS FOR THE PREPARATION OF METHYL BROMIDE USING RADIATION
Arthur A. Asadorian, Midland, and Max R. Broadworth, Bay City, Mich., assignors to The Dow Chemical Company, Midland, Mich.
No Drawing. Filed Sept. 4, 1969, Ser. No. 855,368
Int. Cl. B01j *1/10;* C07c *17/00*
U.S. Cl. 204—163 R                    9 Claims

ABSTRACT OF THE DISCLOSURE

The present invention is a process for the preparation of methyl bromide which comprises refluxing methanol and bromine with exposure of the vapors to radiation of sufficient energy to activate the bromine. The process results in greater than 90% of the bromine employed being converted to methyl bromide.

BACKGROUND OF THE INVENTION

Methyl bromide, a well known refrigerant, fire extinguishing agent and soil fumigant is prepared by the reaction of methanol and hydrobromic acid. In this process, the hydrobromic acid is either generated in situ from bromides and sulfuric acid or externally from bromine and hydrogen. In the former case, sulfuric acid is a necessary constituent of the reaction mass, while in the latter a separate reaction step is involved.

Methyl bromide is also prepared by reacting methanol with a solution of sulfur in bromine. This process produces good yields of the desired product. However, sulfuric acid is produced as a by-product which combines with unreacted sulfur to form a sludge which creates waste disposal problems.

U.S. Pat. 2,173,133 discloses that alkyl bromides can be prepared by reacting an alcohol with bromine in the presence of a reducing agent. The preferred reducing agent for this process is $SO_2$ which is converted to sulfuric acid during the reaction. The acid concentration must be carefully confined within certain limits. If the acid is too concentrated, the formation of ether can occur, while if the acid is too dilute, bromine in the form of hydrobromic acid is lost in the effluent sulfuric acid.

German Pat. 703,835 discloses that methyl bromide may be prepared by reacting methyl alcohol and bromine in the presence of a surface active catalyst. This process requires reaction temperatures of 150° C. or higher as well as the use of a catalyst.

Buckley et al. report in Trans. Far. Soc. 55, 1536 (1959) that when methanol and bromine vapors are contacted in a sealed vessel under reduced pressure in the presence of light, carbon monoxide and hydrogen bromide are formed. This reference goes on to state that the formation of some methyl bromide and water occurred after the products were condensed in liquid air. This procedure was reported to produce relatively small yields of methyl bromide, and only when methanol was employed in a molar ratio to bromine of greater than 4:1, did the yield of methyl bromide approach 50 percent. A two stage reaction is reported, represented by the equations:

(1)     $CH_3OH + 2Br_2 \rightarrow 4HBr + CO$
(2)     $4HBr + 4CH_3OH \rightarrow 4CH_3Br + 4H_2O$

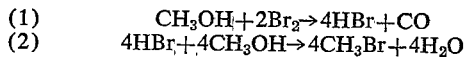

It would be desirable and it is a principal object of the present invention to provide a novel process for the preparation of methyl bromide.

It is a further object to provide such a process wherein methanol and bromine are reacted without the use of reducing agents or material catalysts.

An additional object is to provide such a process in which the formation of undesirable side products, especially those causing waste disposal problems, is minimized or obviated.

An additional object is to provide such a process which will produce high yields of methyl bromide.

SUMMARY OF THE INVENTION

The above objects and other advantages are achieved in the process for the preparation of methyl bromide which is disclosed herein. The present process comprises refluxing a mixture of methanol and bromine with the vapors being subjected to radiation of sufficient energy to activate the bromine.

The term refluxing as used herein is intended to mean heating the methanol and bromine to a temperature sufficient to vaporize them and then cooling the vapors to a temperature sufficient to cause at least part of the methanol vapor to condense. The process is carried out in a reactor designed to allow carbon monoxide formed in the reaction to escape without causing the pressure to increase substantially above ambient.

DETAILED DESCRIPTION OF THE INVENTION

The process of the present invention can be carried out in a reflux condenser having the temperature controlled to reflux methanol and allow the methyl bromide product to pass through as vapor. Use of a fractionating column fitted with a refrigerated total condenser can serve to reflux methanol and allow the methyl bromide product as condensate.

Bromine and methanol are usually introduced to the apparatus as liquids although they may be prevaporized and fed into the apparatus as gases. Sufficient heat is applied to the reactants to cause vaporization with the vapors being exposed to radiation of sufficient energy to activate the bromine, i.e.

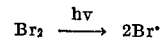

The process has been found to operate efficiently with ultraviolet light as the energy source. However, lower and higher energy radiation may be used provided sufficient energy is supplied to activate the bromine under the reaction conditions. For example gamma radiation and X-rays effectively activate bromine. Lower energy radiation, such as certain wavelengths of visible light up to about 5100 A. will also activate bromine. Radiant energy in the visable range having wavelengths greater than 5100 A. will activate bromine. Weisberger reports in Technique of Organic Chemistry, vol. II, 2nd edition at page 266 that light having wavelengths of from 5107 to 6320 A. will cause the bromine molecule to dissociate. However, the rate of dissociation is reduced at these wavelengths. Therefore, radiant energy having wavelengths in the ultraviolet range is the preferred energy source.

Radiation other than radiant energy, such as alpha and beta particles as well as high energy electrons such as those accelerated by a Van de Graaff generator, may also be used to provide energy for bromine activation.

For most efficient operation the reflux condenser should be cooled to a temperature which will cause complete condensation of the methanol and bromine vapors under the reaction conditions. A condenser temperature range of about 5° to 15° C. is sufficient for complete condensation at normal atmospheric pressure. With a condenser temperature of below 15° C. and above about 5° C. a mixture of methyl bromide and carbon monoxide, which is co-produced in the reaction, will pass through the condenser. This mixture of gases can readily be separated to provide the desired methyl bromide. The carbon monoxide may be recovered as a useful by-product. With a condenser temperature of greater than 15° C. some methanol will pass through. Hydrogen bromide and water are also produced as evidenced by the formation of hydrobromic acid in the boiling vessel. Unexpectedly, greater than 98 percent of the bromine charged can be recovered in the form of methyl bromide and hydrobromic acid indicating that HBr does not pass through the condenser. This occurs even when the condenser is open to the atmosphere and cooled with ordinary ice water.

An alternative method of recovering the methyl bromide is to insert a distillation column between the boiling vessel and the condenser and cool the condenser to a temperature substantially below 0° C. such as by using Dry Ice or liquid nitrogen as the coolant. The coolant should cool the condenser to a temperature of at least about −30° C. In this embodiment, carbon monoxide passes through the condenser with essentially all of the methyl bromide being condensed. The methyl bromide can then be collected and drained off from the bottom of the condenser. This is normally done when the temperature of the vapors in the distillation column approach the boiling point of methyl bromide to yield a methyl bromide product of high purity. Methyl bromide may be recovered in this manner until the reaction between the bromine and methanol is completed. The reaction has approached completion when the vapor temperature rises above the boiling point of methanol i.e. ~65° C.

Another method of recovering methyl bromide is to cool the refluxing vapors to a temperature sufficiently below the boiling point of methyl bromide to liquefy it under the reaction conditions yet not low enough to liquefy the carbon monoxide. In this embodiment, the methyl bromide is collected as liquid condensate such as through a side vent in the reflux column and the carbon monoxide allowed to escape as a vent gas. A cooling temperature of below about 0° C. is necessary with a cooling range of from about −30° C. to about −65° C. being preferred for efficient condensation of the methyl bromide.

In each embodiment, carbon monoxide is allowed to escape from the reaction vessel as it is formed. Allowing carbon monoxide to escape is conveniently accomplished by carrying out the reaction in a vessel having at least one opening through which it can vent.

The process may be run in a continuous manner by periodically draining the hydrobromic acid from the boiling vessel and introducing additional methanol and bromine. Alternatively, the process may be carried out batch by batch.

The methyl bromide recovered normally contains small amounts of impurities such as methyl ether, methylal, methyl formate and some unreacted methanol. Except for methyl ether, these impurities are soluble in water and can easily be separated from the water insoluble methyl bromide by water scrubbing. Methyl ether which remains as an impurity can be removed by conventional means such as scrubbing with sulfuric acid.

The molar ratio of methanol to bromine to be employed is not critical. However, for good yields molar ratios of methanol and bromine should be used that are stoichiometric for the overall reaction $$2Br_2 + 5CH_3OH \rightarrow 4CH_3Br + 4H_2O + CO$$

A molar ratio of methanol to bromine of greater than 5:2 will result in a further increase in yields based on bromine.

The following examples will serve to further illustrate the invention:

EXAMPLES 1–7

In each of the following examples a 500 milliliter 3-neck balloon flask, fitted with a bromine feeder, stirrer and a cold water reflux condenser, was charged with 3 moles (96 grams) of methanol and 1.2 moles (192 grams) of bromine. The bromine and methanol mixture was refluxed for various periods of time up to 6.5 hours. The methyl bromide vapors passed directly from the reactor through the reflux condenser to a water scrubber which leached out any methanol and then through a $CaCl_2$ drier to a Dry Ice condenser.

In Examples 1–4, where the activation energy was provided by either a G.E. sunlamp or a 100 watt H4AB G.E. ultraviolet lamp, average yields of greater than 80% were obtained in operating times of less than six hours.

Examples 5–7 represent comparative experiments. Example 6 illustrates the advantage of using radiation of higher energy than visible light. When ordinary laboratory lighting, which was present during each experiment, was the source of activation energy, methyl bromide was recovered in a 22.8% yield during a reaction time of 6.5 hours. In Example 5, where the bromine and methanol mixture was not brought to the boiling point of methanol, no formation of methyl bromide was observed. Sulfur was used in Example 7 to check its usefulness as a catalyst. The yield in this experiment was 54.4% during the six hour operating period. This corresponds to the yield predictable when assuming that all of the sulfur would be present as $SBr_6$ and reacts as a reagent as disclosed in U.S. Pat. 2,359,828.

TABLE I

| Example number | 1 | 2 | 3 | 4 | 5 | 6 | 7 |
|---|---|---|---|---|---|---|---|
| Radiation source and/or catalyst employed: | | | | | | | |
| (a) Sulfur (5 g.) | O | O | O | O | O | O | X |
| (b) Sunlamp | X | X | O | O | O | O | O |
| (c) Ultraviolet lamp | O | O | X | X | O | O | O |
| Bromine feed period, hrs | 0.4 | 0.5 | 0.3 | 0.4 | 4.4 | 0.3 | 0.4 |
| Total operating time, hrs | 4.2 | 5.5 | 2.2 | 0.9 | 5.6 | 6.5 | 6.0 |
| Temperature range, ° C | 61–103 | 60–102 | 54–106 | 66–105 | 57–63 | 59–75 | 59–80 |
| $CH_3Br$ recovered, gms | 189 | 188 | 192 | 180 | 0 | 52 | 124 |
| Percent yield based on $Br_2$ | 82.9 | 82.4 | 82.2 | [1] 79.0 | 0 | 22.8 | 54.4 |

[1] Vigorous reaction rate caused back pressure and some losses.

EXAMPLE 8

An experiment was conducted in equipment similar to that of Example 1 except that a Vigreaux fractionating column was used for more efficient distillation. The column was fitted with a total condenser cooled with Dry Ice in $CH_2Cl_2$. The product was removed as vapor or liquid condensate at the base of the condenser. The ultraviolet lamp was used as the radiation source.

In one run, three moles (96 grams) of boiling methanol was treated dropwise with 1.5 moles (240 grams) of bromine added over a period of 2.0 hours. After 88 percent of the bromine had been added, the boiling liquor temperature dropped from an initial 65° to 55° C. under total refluxing conditions, and the vapor temperature dropped to 7° C. The product was taken off slowly with the vapor temperature holding at about 7° C. The total product recovered was 208.8 grams of which 196.0 grams was found to be pure methyl bromide. This was an 86 percent yield based on bromine as the limiting reactant.

The total time of the run was 5.6 hours with maximum temperatures being 30° C. for the vapors and 99° C. for the boiling liquor which remained red throughout the entire process.

EXAMPLE 9

In a manner similar to that of Example 8 six moles (192 grams) of boiling methanol was treated dropwise with 1.5 moles (240 grams) of bromine over a period of 1.65 hours. After all the bromine was added, the boiling liquor temperature dropped to 62° C. and the vapor temperature to 8° C. under total refluxing conditions. After an additional 1.5 hours, with the red boiling liquor still at 62° C. and the column vapors at 8° C., product takeoff was started at a controlled rate to maintain the vapor temperature slightly above the boiling point of methyl bromide. In an additional 1.3 hours the boiling red liquor had dropped to 57° C., its minimum for the entire run. After a total time of 11.5 hours, the boiling liquor became light yellow at 80° C. and the vapor reached its maximum of 30° C.

The recovered product weighed 265.8 grams, of which 240.4 grams were pure methyl bromide. This was an 84.3 percent yield based on bromine as the limiting reactant.

EXAMPLE 10

Three moles (96 grams) of methanol was treated dropwise with 1.2 moles (192 grams) of bromine which provided proportions stoichiometric for the reaction $$5CH_3OH + 2Br_2 \rightarrow 4CH_3Br + CO + 4H_2O$$

The bromine was added over a period of 4.1 hours while the liquor was being refluxed using an ice water, ≈0° C., condenser. Some of the methyl bromide formed vented off with the carbon monoxide through the ice water condenser and was collected in a Dry Ice trap.

Product takeoff was commenced when the vapor temperature reached 8° C. After an operating time of 6.7 hours a total of 212.3 grams of product was recovered from the cold trap and product takeoff. This represented a 93.2% yield of product which mass spectral analysis disclosed to consist of:

| | Percent |
|---|---|
| Methyl bromide | 97.3 |
| Methyl ether | 0.18 |
| Methylal | 0.34 |
| Methyl formate | 1.46 |
| Methanol | 0.7 |

Based on this analysis, the yield of pure methyl bromide was 90.6%.

The residual hydrobromic acid in the reactor pot weighed 56.1 grams and contained 15.8 grams of Br⁻ or 8.2% of the feed bromine. This plus the 90.6% bromine accounted for as methyl bromide gave a total of 98.8% of the feed bromine accounted for.

EXAMPLE 11

An experiment was conducted in a manner similar to Example 10 except that the condenser was cooled with Dry Ice in CH₂Cl₂. All of the methyl bromide was recovered by product takeoff since it could not pass through the Dry Ice condenser. Pure methyl bromide was recovered in a yield of 90.5%. The bromine recovery was determined to be 98.7%.

EXAMPLE 12

An additional experiment was conducted in the manner of Example 11 except that a 200 watt, 120 volt lamp was used as the radiation source rather than the ultraviolet light as in Example 11. During a total reaction time of 7.6 hours, 199.2 grams of 95% pure methyl bromide was recovered. This represented a methyl bromide yield of 83% based on the bromine fed.

We claim:
1. A process for the preparation of methyl bromide which comprises:
   (a) refluxing, in a vessel having at least one opening for vent gases, a mixture of methanol and bromine while exposing the vapors to radiation of sufficient energy to activate the bromine thereby forming a reaction product containing methyl bromide and carbon monoxide, and
   (b) allowing the carbon monoxide to escape through the opening as a vent gas.

2. The process of claim 1 wherein the radiation is in the form of ultraviolet light.

3. The process of claim 1 wherein the refluxing vapors are cooled to a temperature of from 5° to 15° C.

4. The process of claim 1 wherein the methanol and bromine are condensed at a temperature sufficiently high to permit at least some of the methyl bromide product to pass through the reflux condenser and the product which passes through is condensed at a temperature of at least about −30° C.

5. The process of claim 1 wherein the refluxing vapors are cooled to a temperature below the boiling point of methyl bromide but above the boiling point of carbon monoxide thereby permitting carbon monoxide to escape as a vent gas and collecting methyl bromide as a liquid condensate.

6. The process of claim 5 wherein the refluxing vapors are cooled to a temperature of from about −30° to about −65° C.

7. The process of claim 1 wherein the molar ratio of methanol to bromine is at least 5:2.

8. The process of claim 1 wherein the methyl bromide product is purified by water scrubbing.

9. The process of claim 8 wherein the product is scrubbed with sulfuric acid after water scrubbing.

References Cited

UNITED STATES PATENTS

| 2,540,127 | 2/1951 | Lacomble et al. | 204—163 |
| 2,639,301 | 5/1953 | Ruh et al. | 204—163 X |
| 3,428,539 | 2/1969 | Lester | 204—163 |

FOREIGN PATENTS

| 791,702 | 8/1968 | Canada | 204—163 |

BENJAMIN R. PADGETT, Primary Examiner

U.S. Cl. X.R.

204—163 HE

UNITED STATES PATENT OFFICE
CERTIFICATE OF CORRECTION

PO-1050
(5/69)

Patent No. 3,682,805      Dated August 8, 1972

Inventor(s) A. A. Asadorian & M. R. Broadworth

It is certified that error appears in the above-identified patent and that said Letters Patent are hereby corrected as shown below:

Column 2, line 30, delete "methanol and allow the" and "prod-" and insert after reflux --all of the alcohol and take off--.

Signed and sealed this 29th day of May 1973.

(SEAL)
Attest:

EDWARD M. FLETCHER, JR.
Attesting Officer

ROBERT GOTTSCHALK
Commissioner of Patents